United States Patent
Blair et al.

(10) Patent No.: US 8,988,805 B1
(45) Date of Patent: Mar. 24, 2015

(54) METHOD FOR CLIPPING HARD DRIVES WHILE PRESERVING FULL ACTUATOR ARM MOVEMENT

(71) Applicant: Toshiba Global Commerce Solutions Holdings Corporation, Tokyo (JP)

(72) Inventors: Brian E. Blair, Raleigh, NC (US); Donald Johnson, Cary, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

(21) Appl. No.: 14/225,741

(22) Filed: Mar. 26, 2014

(51) Int. Cl.
*G11B 20/12* (2006.01)

(52) U.S. Cl.
USPC .............................. 360/48; 360/78.04; 360/55

(58) Field of Classification Search
None
See application file for complete search history.

(56) References Cited

U.S. PATENT DOCUMENTS

| | | | |
|---|---|---|---|
| 5,293,565 A | 3/1994 | Jaquette et al. | |
| 5,953,744 A | 9/1999 | Marasco | |
| 6,130,796 A * | 10/2000 | Wiselogel | 360/75 |
| 6,445,525 B1 * | 9/2002 | Young | 360/48 |
| 6,717,758 B2 * | 4/2004 | Adams et al. | 360/48 |
| 6,763,430 B1 | 7/2004 | Camp | |
| 6,957,379 B1 * | 10/2005 | Patapoutian et al. | 714/774 |
| 6,978,345 B2 * | 12/2005 | Tomaszewski et al. | 711/112 |
| 7,280,745 B2 * | 10/2007 | Mollie et al. | 386/200 |
| 7,864,476 B2 * | 1/2011 | Ehrlich | 360/60 |
| 8,014,093 B2 | 9/2011 | Koester | |
| 8,046,533 B2 | 10/2011 | Kompella et al. | |
| 8,190,837 B2 | 5/2012 | McLeod et al. | |
| 8,773,787 B1 * | 7/2014 | Beker | 360/78.06 |
| 8,819,333 B2 * | 8/2014 | Walls | 711/103 |
| 8,879,191 B1 * | 11/2014 | Olds et al. | 360/78.04 |
| 2008/0140969 A1 | 6/2008 | Lawrence | |
| 2012/0254508 A1 * | 10/2012 | Walls | 711/103 |
| 2014/0325128 A1 * | 10/2014 | Walls | 711/103 |

OTHER PUBLICATIONS

Kim, S. et al. "Zoned-partitioning of tree-like access methods." Information Systems 33 (2008), Available online at www.sciencedirect.com, Elsevier, pp. 315-331.

IBM. "160 GB or 250 GB SATA hard drive lube ridge build-up when extended runtime." retrieved from Internet on Mar. 4, 2014, pp. 1-3 <http://www-947.ibm.com/support/entry/portal/docdisplay?Indocid=migr-5091726>.

Reclaime. "Reasons of hard drive capacity clipping." retrieved from Internet on Aug. 27, 2013, pp. 1-3 <http://www.reclaime.com/library/hard-disk-capacity-clipping.aspx>.

\* cited by examiner

*Primary Examiner* — Wayne Young
*Assistant Examiner* — James L Habermehl
(74) *Attorney, Agent, or Firm* — Coats & Bennett, PLLC (57) ABSTRACT

A hard disc drive (HDD) of a larger native capacity is clipped to emulate a smaller capacity drive by allocating storage space in tracks in at least both a radially innermost region and radially outermost region of the platter(s). During normal operation, when data is written to or read from the clipped HDD, the actuator arm will move through its entire, normal range of motion, as the read/write heads seek tracks in both the radially inner and outer regions of the platter(s). In some embodiments, storage space is also allocated from tracks in regions interposed between the inner and outer regions. In one embodiment, all tracks on the platter(s) are divided into regions of substantially equal data storage capacity, and the storage space is allocated for the clipped HDD is divided substantially evenly across all the regions.

20 Claims, 9 Drawing Sheets

METHOD FOR CLIPPING HARD DRIVES WHILE PRESERVING FULL ACTUATOR ARM MOVEMENT

FIELD OF INVENTION

The present invention relates generally to hard disc drive clipping, and in particular to a method of clipping that preserves full movement of an actuator arm during use.

BACKGROUND

Since their invention by IBM in 1956, hard disc drives (HDDs) have dramatically decreased in size, cost, data access time, and power consumption, and have even more dramatically increased in data storage capacity. At the time of filing this application, 1 TB to 4 TB HDDs are common for desktop computing applications. Indeed, the smallest data storage capacity HDD commonly available is 320 GB.

A consequence of the rapid increase in drive capacities over a brief time span is that many legacy computing and communication systems in use were designed for—and indeed require—HDDs of far lower data storage capacity. For example, the BIOS system in some computer motherboards, and some older operating systems (e.g., Windows® 2000), do not recognize HDDs larger than 128 GB.

Other systems, such as Point of Sale (POS) terminals, were designed to operate with, e.g., 40 GB HDDs. In many cases, a single, optimized disc image—that is, the collection of data resident on a full HDD—is created, and replicated across the HDDs in all POSs in an enterprise. When a HDD fails, or a new, compatible POS is added to the system, the hard disc image cannot be loaded, as new 40 GB drives are simply not manufactured. Hard disc imaging software cannot load a smaller (e.g., 40 GB) disc image onto a larger (e.g., 320 GB) HDD, due to the size mismatch.

Clipping is a process by which a larger data capacity HDD is made to emulate a smaller capacity HDD. Only a portion of the data storage space on the larger HDD is allocated for use, or made available for read and write operations, and only this portion is reported by the HDD. In this manner, a device driver, BIOS, operating system, or other software attempting to access the HDD "sees" the lower data capacity HDD, and can function properly. The excess data storage space is simply never accessed or utilized.

HDD clipping is implemented in firmware in the control electronics of a HDD. In the case of a wide-spread need, such as emulating a 128 GB drive for compatibility with widely deployed legacy operating systems, an entire line of HDDs includes the clipping functionality, which may be optionally invoked by setting jumpers on the drive. In the case of special requirements, such as providing 40 GB clipped drives for POS terminals, the appropriate firmware may be included as a custom option from the HDD manufacturer.

HDD clipping is typically implemented by simply mapping the entire (lower capacity) disc image size to continuous sectors along one track, or across a few adjacent tracks, of one or more HDD platters. This minimizes the firmware complexity of translating track and sector specifiers, and additionally provides the lowest data latency, as the actuator arm that positions the read/write head may not need to move at all, and if so it only moves to adjacent or very nearby tracks.

HDDs, however, are designed to move the actuator arm to position the read/write head over all tracks on the platter(s). Additionally, HDDs are designed to move the read/write head to a "landing" area—referred to as unloading the head—prior to powering down the HDD. In implementations where HDDs are run extensively without powering down, such as POS terminals that are never turned off, the actuator arm does not unload the head by moving it to the landing zone. This may cause a failure due to migration of lubricant in the mechanical couplings of the actuator mechanism. The lube migration—normally prevented by routinely-occurring load/unload cycles—may prevent the HDD from unloading the read/write head when a power-down is eventually attempted. This has been known to occur in as little as two weeks of continuous operation, even with the actuator arm otherwise moving over all tracks of the platter.

This problem of restricted freedom of motion due to failure to fully exercise the actuator arm is exacerbated in a clipped drive, in which the actuator arm moves over only, at most, a few tracks when reading or writing data. In this case, the actuator arm does not move over all the data areas of the platter, much less to the landing zone. This can accentuate the migration of lubricant to impede such motion if it is ever required (e.g., upon a power-down operation).

One approach to prevent clipped HDD failure due to severely limited range of motion of the actuator arm is to periodically "exercise" the actuator arm by driving the read/write head to various tracks on the platter, as well as unloading the heads on the landing zone, and loading them onto the platter. One known HDD exercise program, recommended to be run prior to a system shutdown or restart, performs 40,000 seeks, with a load/unload operation every 1,000 seeks. This provides 40,000 full-stroke seek pairs 40 loads/unloads. This HDD exercise is sufficient to disperse any lubricant build-up in areas in which mechanical parts of the actuator need to move. However, periodic use of a HDD exercise program renders the drive unusable for the duration of the exercise, which will cause performance degradation if the system attempts to read or write the clipped HDD at the same time.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a HDD of a larger native capacity is clipped to emulate a smaller capacity drive by allocating storage space in tracks in at least both a radially innermost region and radially outermost region of the platter(s). During normal operation, when data is written to or read from the clipped HDD, the actuator arm will move through its entire, normal range of motion, as the read/write heads seek tracks in both the radially inner and outer regions of the platter(s). In some embodiments, storage space is also allocated from tracks in regions interposed between the inner and outer regions. In one embodiment, all tracks on the platter(s) are divided into regions of substantially equal data storage capacity, and the storage space is allocated for the clipped HDD is divided substantially evenly across all the regions. In one embodiment, a disc image written to a clipped HDD is written proportionally to all allocated regions, so as to distribute the data physically across the platter(s) so as to fully exercise the actuator arm even if the disc image is smaller than the clipped HDD data storage capacity.

One embodiment relates to a method of clipping a HDD. The HDD has a native data storage capacity arranged in a plurality of concentric tracks on one or more platters. The HDD is clipped to have an effective storage capacity lower than the native capacity. Only storage space up to the effective storage capacity is allocated for use, and is selected from storage space within the native storage capacity. The storage to be allocated for use comprises both first storage space in one or more tracks in a radially innermost region of the platter and second storage space in one or more tracks in a radially outermost region of the platter. Data are written to and read from only the allocated storage space, such that the drive is effectively limited to the effective capacity. In operation, an actuator arm moves a read/write head between the radially innermost region and radially outermost region of the platter during data read and write operations.

Another embodiment relates to a method of operating a HDD to store a drive image. The HDD has an effective storage capacity arranged in a plurality of concentric tracks on one or more platters. The tracks are divided into a plurality of contiguous regions extending from a radially innermost region of the platter to a radially outermost region of the platter. Each region includes a substantially equal amount of storage space. A storage capacity per region is calculated by dividing the effective storage capacity by the number of regions. A utilization factor is calculated by dividing the size of the disc image by the effective storage capacity. An amount of the disc image is written to each region that is substantially equal to the storage capacity per region times the utilization factor. In operation, an actuator arm moves a read/write head over all regions of the platter during read and write operations to the HDD.

Yet another embodiment relates to a HDD having a native data storage capacity clipped to provide an effective data storage capacity less than the native capacity. The HDD includes one or more platters operative to store data in a plurality of concentric tracks, and an actuator arm operative to move a read/write head radially over the platter and align it with any track. The HDD also includes a controller circuit operative to allocate for use only storage space up to the effective storage capacity, selected from storage space within the native storage capacity, and write data to and read data from only the allocated storage space, such that the drive is effectively limited to the effective capacity. The effective storage capacity allocated for use comprises both first storage space in one or more tracks in a radially innermost region of the platter and second storage space in one or more tracks in a radially outermost region of the platter. In operation, the actuator arm is operative to move the read/write head between the radially innermost region and radially outermost region of the platter during data read and write operations.

Still another embodiment relates to a system, including a HDD operative to store a disc image. The system includes a HDD having an effective data storage capacity in a plurality of concentric tracks on one or more platters, and a controller circuit operative to write a disc image to the HDD. The controller writes the disc image by dividing the tracks into a plurality of contiguous regions extending from a radially innermost region of the platter to a radially outermost region of the platter, each region including a substantially equal amount of storage space; calculating a storage capacity per region by dividing the effective storage capacity by the number of regions; calculating a utilization factor by dividing the size of the disc image by the effective storage capacity; and writing an amount of the disc image to each region that is substantially equal to the storage capacity per region times the utilization factor. Subsequent to writing the disc image, the HDD is operative to move an actuation arm holding a read/write head over all regions of the platter during read and write operations to the disc.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
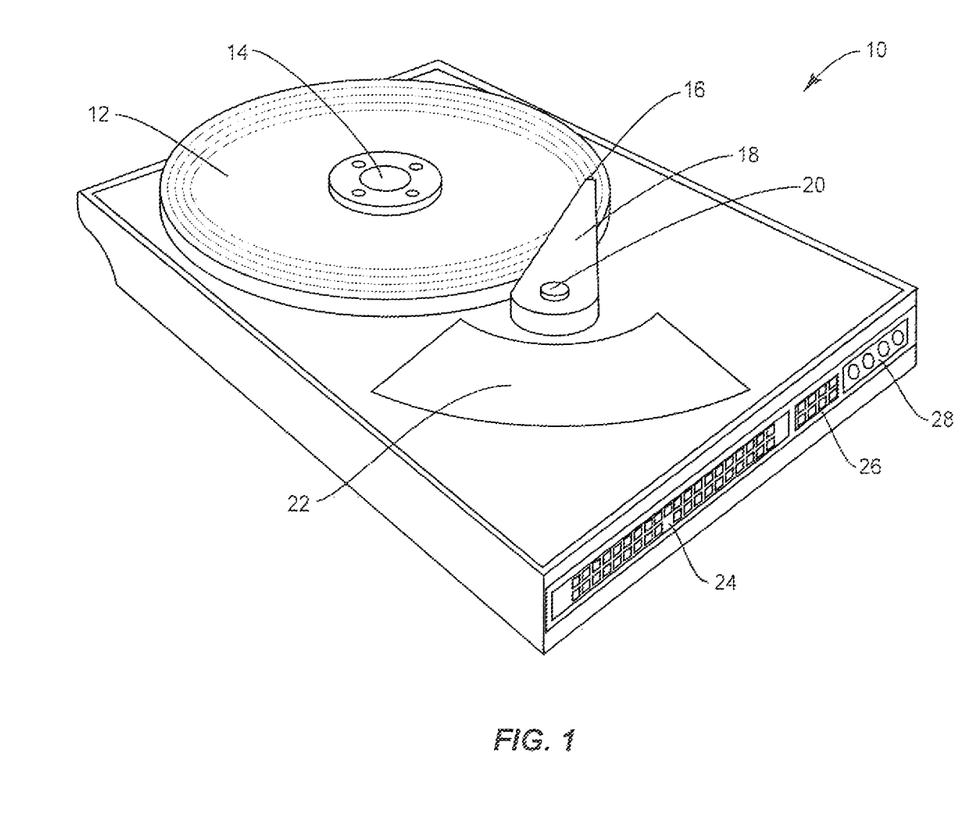
FIG. 1 is a perspective view of internal components of a hard disc drive.

FIG. 1 depicts the interior of a representative hard disc drive (HDD) 10. The HDD stores data in a non-volatile manner on magnetic or optical media in the form of one or more rotating platters 12. Numerous platters 12 may be stacked vertically to increase capacity, and/or to enhance reliability by writing the same data simultaneously to multiple platters 12. The identified deficiencies of the prior art and the operative principles of embodiments of the present invention are equally applicable to a HDD 10 containing one, two, or multiple platters 12. Accordingly, for simplicity of discussion, only one platter 12 will be assumed, although it is to be understood that this simplification does not limit the scope of the present invention. The platter 12 rotates at a high rate of speed about, and is driven by, a spindle 14.

A read/write head 16, affixed to the end of an actuator arm 18, is operative to read data from, and write data to, the platter 12 in concentric tracks. The actuator arm 18 steps the read/write head 16 to the appropriate radial position on the platter 12 for a specific track by pivoting about an axis 20, as driven by an actuator 22. A data connector 24, such as an IDE, SATA, USB, or similar connector, provides an interface to a POS, computer, or other system component that writes data to and reads data from the HDD 10. Jumper pins 26 may provide for configuration of the HDD 10, and a power connector 28 supplies power. Data processing and motor drive electronics internal to the HDD 10 are not depicted in FIG. 1. Furthermore, the components depicted in FIG. 1 are typically encased by an enclosure.

Figure 2:
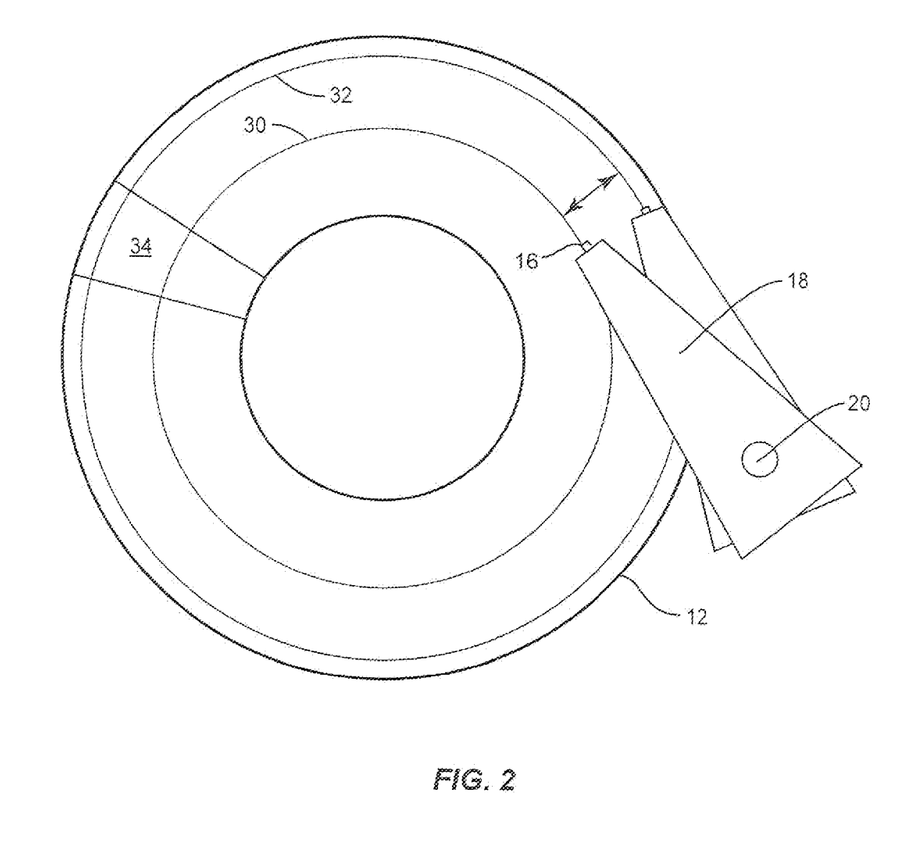
FIG. 2 is a diagram depicting movement of an actuator arm across a platter.

FIG. 2 depicts the positioning of the read/write head 16 over an innermost track 30 and an outermost track 32 of the platter 12, by pivoting the actuating arm 18 about its axis 20. Of course, the actuating arm 18 may additionally move to intermediate positions, to position the read/write head 16 over any selected track, of which there may be more than a thousand for a 3.5 inch HDD. FIG. 2 also depicts a sector 34. A sector 34 is a pie-shaped partition of the platter 12. As the platter 12 rotates, a plurality of sectors 34 pass beneath the read/write head 16 as it is positioned over a track 30, 32. A sector may comprise, e.g., 512 bytes of storage space. Data stored on the HDD are accessed, by a device driver or low-level OS component, by track and sector. At least for the purposes of explication of embodiments of the present invention, both track and sector may be considered logical constructs; the physical storage and retrieval of data on the platter 12 may vary across HDDs.

For the purpose of discussion herein the tracks 30, 32 on a HDD platter 12 are divided into regions, each comprising one or more tracks. Regions are thus conceptually concentric bands about the platter 12. In one embodiment, the tracks are divided into regions such that each region provides substantially the same storage space.

Figure 3:
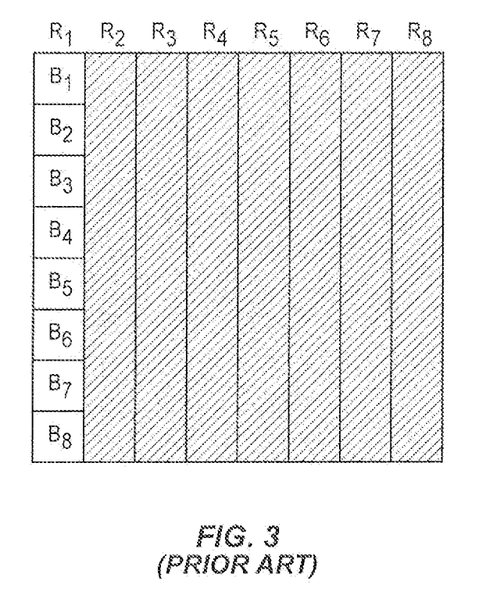
FIG. 3 is a diagram of data distribution in a clipped drive, according to the prior art.

FIG. 3 depicts the typical allocation of useable storage space when a larger capacity HDD is clipped, to emulate a smaller capacity HDD. The clipped HDD capacity—represented in this in this example by eight equal data blocks $B_1$-$B_8$ is allocated only in one region $R_1$ of the larger HDD 10. This simplifies the address (e.g., track and sector number) translation performed by the processor circuit in the HDD 10 electronics. Additionally, since the data may reside on a single track, or in a few adjacent tracks with region $R_1$, latency is minimized, as the actuator arm 18 may not need to move at all, or may need to move only minimally, for the read/write head 16 to access adjacent tracks within $R_1$.

However, the minimal movement of the actuator arm 18 may introduce mechanical wear, and ultimately mechanical failure. The HDD 10 is designed for the actuator arm 18 to move many, many times throughout its full range of motion across the platter 12, as well as routinely unload the read/write head 16 to a landing zone. Restricting movement of the actuator arm 18 to only a few tracks ins one region $R_1$, or to only one track, in which case it does not move at all, may invite lubricant migration and/or other mechanical anomalies that routine movement of the actuator arm 18 is designed to prevent. As discussed above, periodically running a HDD exerciser program can alleviate the problem by repeatedly forcing the actuator arm 18 through its full range of motion. However, a HDD exerciser program will introduce latency if the system in which a clipped HDD resides requires access to data on the disk at the same time.

According to embodiments of the present invention, when clipping a larger capacity HDD 10 to a smaller effective capacity, the storage space allocated for use by the clipped HDD 10 is selected so as to automatically force significant motion of the actuator arm 18.

Figure 4:
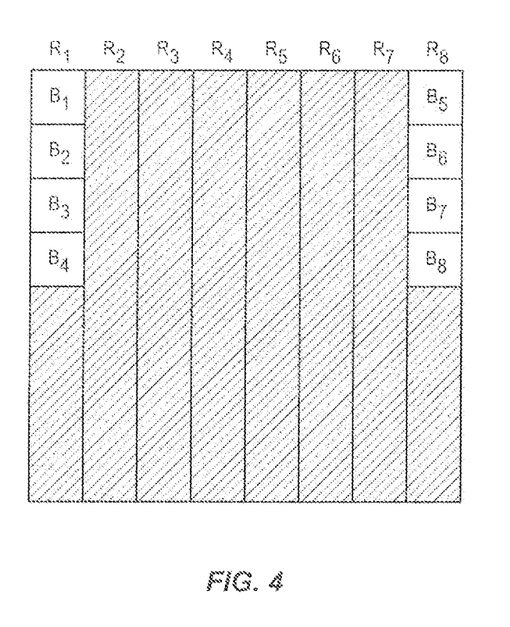
FIG. 4 is a diagram of data distribution in a clipped drive, according to one embodiment of the present invention.

FIG. 4 depicts an allocation of useable storage space when a larger capacity HDD 10 is clipped to emulate a smaller capacity HDD 10, according to one embodiment of the present invention. In this embodiment, half of the space allocated to form the clipped HDD 10 is allocated in one region $R_1$ that is the radially innermost or outermost region on the platter 12. Even if that region $R_1$ has sufficient storage space to provide the entire clipped HDD 10 capacity, only half of the space is allocated from $R_1$. For example, in clipping a 320 GB HDD 10 to a 40 GB HDD 10, a maximum of 20 GB would be allocated from $R_1$ of the 320 GB HDD 10. The other half of the clipped HDD 10 capacity (e.g., 20 GB in this example) is allocated from a different region $R_8$, at the furthest opposite radial position from $R_1$. For example, if $R_1$ is the radially innermost region of the platter 12, then $R_8$ is the radially outermost region, and vice versa. In this embodiment, as the host system (e.g., computer, POS, or the like) accesses data on the clipped HDD 10, the actuator arm 18 will be moved throughout its full range of motion, to position the read/write head 16 over both tracks in $R_1$ and those in $R_8$.

Many systems—even legacy systems originally fielded with small HDD capacity—use only a small fraction of even the limited HDD capacity with which they were designed. For example, a deployment of POSs designed with 40 GB HDDs 10 may have a disc image distributed to them that is only 10 GB, or one-fourth the available data storage capacity. In the example of FIG. 4, this disc image would occupy only data blocks $B_1$ and $B_2$, both of which are allocated from $R_1$. Hence, in this case, even dividing the blocks $B_1$-$B_8$ between regions $R_1$ and $R_8$ at opposite radial extents of the platter 12 would be insufficient to ensure sufficient movement of the actuator arm 18 without explicit exercising cycles.

Figure 5:
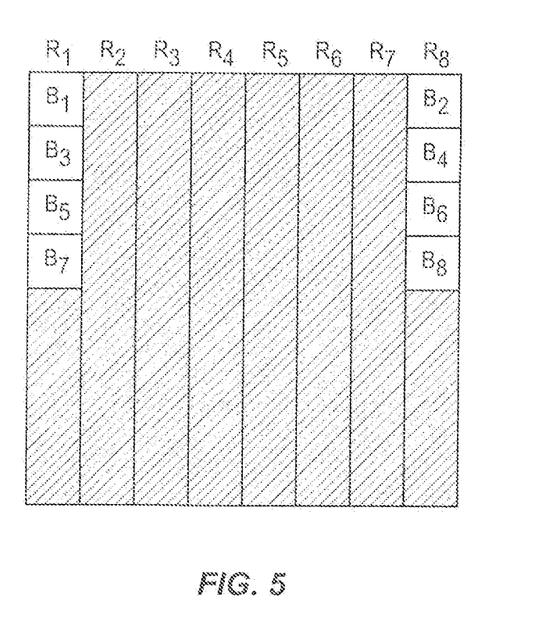
FIG. 5 is a diagram of data distribution in a clipped drive, according to another embodiment of the present invention.

FIG. 5 depicts an allocation of useable storage space when a larger capacity HDD 10 is clipped to emulate a smaller capacity HDD 10, according to another embodiment of the present invention. In this embodiment, half of the allocated storage space is taken from region $R_1$ and half from $R_8$, as in the embodiment depicted in FIG. 4. However, here the allocation alternates, or ping-pongs, between the regions, with $B_1$ allocated from $R_1$, 2 allocated from $R_8$, $B_3$ from $R_1$, $B_4$ from $R_8$, and so on. In this embodiment, even if only a small fraction of the clipped HDD 10 data storage capacity is actually utilized, the actuator arm 18 will still be forced to move through its full range, as the read/write head 18 must seek tracks in both $R_1$ and $R_8$. One potential disadvantage of this embodiment is that the host system will experience greater average data access latency than that specified for the native (unclipped) HDD 10, because the actuator arm 18 is forced through numerous full deflections across the entire platter 12 when performing a large data access (e.g., a large file).

Figure 6:
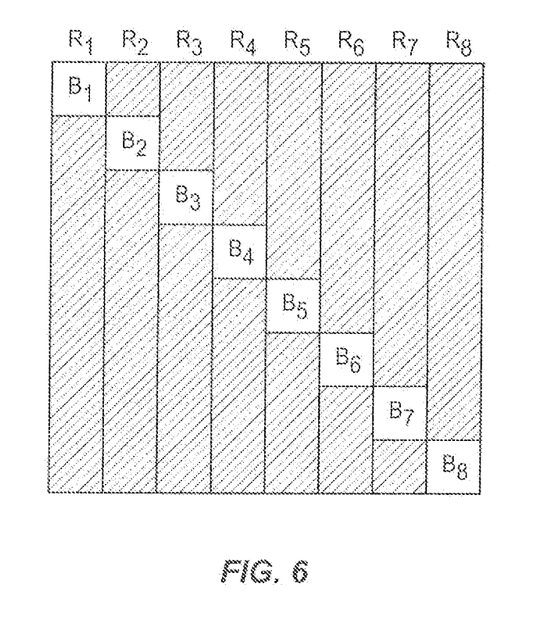
FIG. 6 is a diagram of data distribution in a clipped drive, according to still another embodiment of the present invention.

FIG. 6 depicts an allocation of useable storage space when a larger capacity HDD 10 is clipped to emulate a smaller capacity HDD 10, according to another embodiment of the present invention. In this embodiment, a pro rata amount of storage space is allocated from each region $R_1$-$R_8$. Although FIG. 6 depicts successive data blocks allocated to the clipped HDD 10 are in successive regions (i.e., in a diagonal pattern), the location of the blocks within the regions is irrelevant to the purpose and effect of forcing sufficient movement of the actuation arm 18 across the platter 12. Once the actuation arm 18 is moved to position the read/write head 16 over a track, all sectors within that track pass beneath the read/write head 16 in each rotation of the platter 12. Accordingly, the data blocks $B_i$ could be allocated across the regions $R_1$-$R_8$ in a straight line, or in any other pattern.

Figure 7:
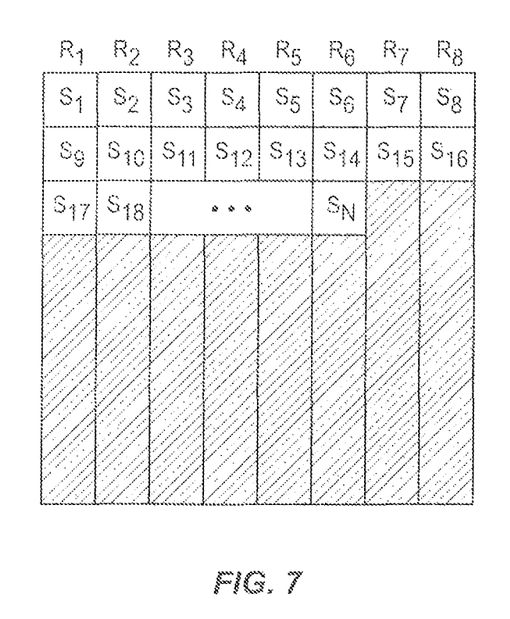
FIG. 7 is a diagram of data distribution in a clipped drive, according to yet another embodiment of the present invention.

The alternating allocation of FIG. 5 may be combined with an all-region utilization allocation similar to that of FIG. 6. FIG. 7 depicts an allocation of useable storage space when a larger capacity HDD 10 is clipped to emulate a smaller capacity HDD 10, according to another embodiment of the present invention. FIG. 7 depicts sector-size blocks of data (or multiples of the sector size), rather than the data blocks of FIGS. 3, 4-6 (where each block represents ⅛ of the clipped HDD 10 capacity). Here, as many sectors $S_1, S_2, \ldots S_N$ as necessary to provide the clipped HDD 10 data storage capacity are allocated for use. Initially, successive sectors are allocated across all regions. Sectors $S_1$-$S_8$ are allocated from $R_1$-$R_8$, as in FIG. 6 (depicted as straight across, rather than the diagonal pattern of FIG. 6). Sector $S_9$ is then allocated from $R_1$, $S_{10}$ from $R_2$, and so on until the entire clipped HDD 10 capacity is allocated. In this hybrid approach, low utilization of the clipped HDD 10 will still force movement of the actuation arm 18 across the platter 12. However, the data access latency for large accesses will be less than that in the embodiment depicted in FIG. 5, as successive sectors may be retrieved by moving the read/write head 16 only one contiguous region, or a few tracks, rather than across the full extent of the platter 12.

Figure 8:
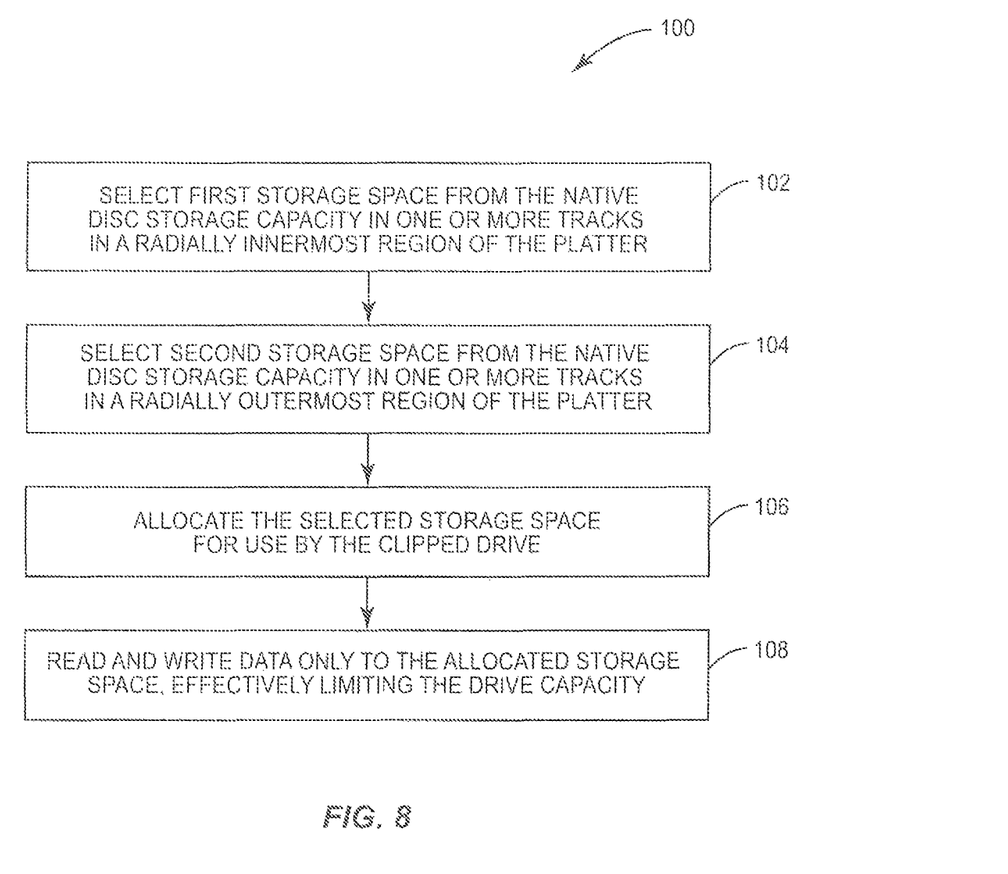
FIG. 8 is a flow diagram of a method of clipping a hard disc drive.

FIG. 8 depicts a method 100 of clipping a HDD 10, which covers the essential steps common to the above described embodiments. The HDD 10 has a native data storage capacity, arranged in a plurality of concentric tracks on one or more platters 12. The clipped HDD 10 will have an effective storage capacity lower than the native capacity. First storage space is selected from the native storage capacity in one or more tracks in a radially innermost region of the platter 12 (block 102). Second storage space is selected from the native storage capacity in one or more tracks in a radially outermost region of the platter 12 (block 104). The selected storage space is allocated for use by the clipped HDD 10 (block 106). In some embodiments, other storage space is selected from intermediate regions, and is also allocated for use. Subsequently, data is written to and read from only the allocated storage space (block 108); the unallocated storage space is unused. Restricting read and write access to only the allocated storage space effectively limits the clipped HDD 10 to the effective storage capacity. As a consequence of the allocated storage space being selected from (at least) the innermost and outermost track regions, when the clipped HDD 10 is accessed, an actuator arm 18 moves across the full extent of the platter 12 in order to position the read/write head 16, thus avoiding mechanical problems resulting from extremely limited motion of the actuator arm 18.

The above discussion has focused on the allocation of space on a platter 12 when clipping a higher capacity HDD 10 to an effective smaller capacity HDD 12. By carefully selecting the storage space to be allocated to the clipped HDD 10, mechanical failure due to insufficient movement of the actuator arm 18 may be minimized or avoided. In one embodiment discussed above (with respect to FIG. 5), the concept of utilization of the clipped HDD 10—quite apart from creation of the clipped HDD 10—was considered. This consideration is expanded in the embodiments to follow.

In many applications, a single disc image is prepared and distributed to a large number of HDDs 10. For example, in a retail environment, a mapping of UPC codes to inventory, pricing information, and the like may be infrequently updated. Since all POSs must operate off of the same data, a single disc image including the relevant information is created, tested, and optimized. When it is ready, the one disc image is written to the HDDs 10 of possibly hundreds or more POSs.

If a disc image is small (e.g., 10 GB) and the POSs include HDDs 10 of 40 GB—whether native 40 GB HDDs 10 or larger HDDs 10 that have been clipped to 40 GB—the disc image still only uses 25% of the available HDD 10 capacity. In many of the clipped HDDs 10 created according to embodiments of the present invention, and additionally in original, native 40 GB HDDs 10, the actuator arm 18 may still experience a relatively limited degree of motion across the platter 12, possibly leading to mechanical problems. In fact, any time a disc image is written to a HDD 10, and a system primarily reads and writes the disc image—that is, it does not utilize HDD 10 storage space other than the disc image—if the disc image is considerably smaller than the available HDD 10 capacity (whether native or clipped), the limited motion of the actuator arm 18 is potentially a problem. For example, if the above-described POS were upgraded to accept and operate a 320 GB HDD 10, clipping would not be necessary. However, only accessing 10 GB of the 320 GB capacity—roughly 3%—may lead to the wear problems described herein if the disc image is written as depicted in FIG. 3.

In one embodiment, when writing a small disc image to a HDD 10 having a much larger available data storage capacity, the host system distributes the disc image across the platter 12 according to the inventive concepts presented above. That is, rather than simply filling available sectors in the current track according to a file allocation table or other map of HDD 10 data, the operating system, BIOS, device driver, or other software module responsible for low-level mapping of data to tracks and sectors on the HDD 10, distributes the data across the platter 12, as described above with reference to FIGS. 4-7.

Figure 9:
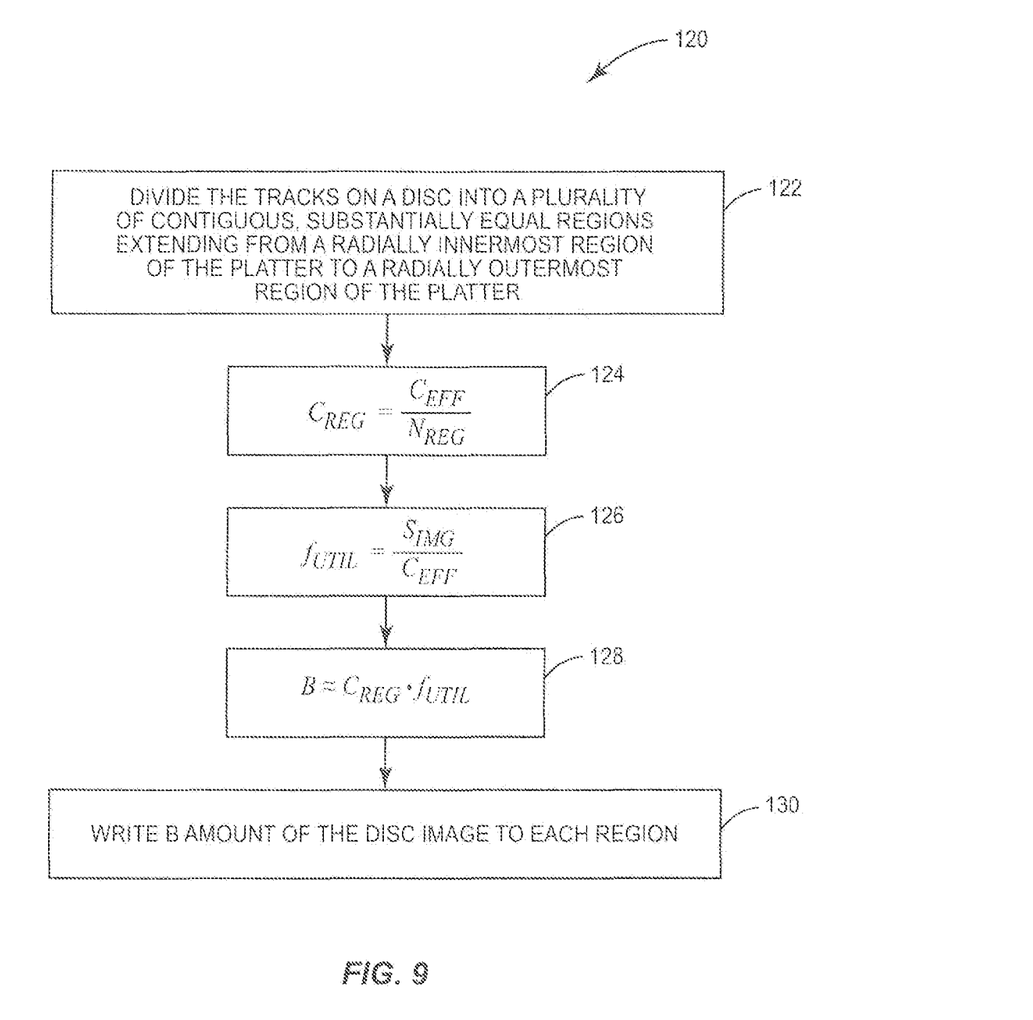
FIG. 9 is a flow diagram of a method of writing a disc image to a hard disc drive.

For example, to implement the embodiment of FIG. 6, the size of data block to be written to each region may be determined by a method 120, depicted in FIG. 9. The method 120 is operative on a HDD 10 having an effective storage capacity arranged in a plurality of concentric tracks on one or more platters 12. The HDD 10 is operative to store a drive image. Initially, the tracks are divided into a plurality of contiguous regions extending from a radially innermost region of the platter to a radially outermost region of the platter, wherein each region including a substantially equal amount of storage space (block 122).

An effective storage capacity per region $C_{REG}$ is calculated by dividing the HDD 10 effective storage capacity $C_{EFF}$ by the number of regions $N_{REG}$ (block 124), according to:

$$C_{REG} = C_{EFF}/N_{REG}$$

where $C_{EFF}$ is the native capacity of a non-clipped HDD 10, or the clipped capacity of a clipped HDD 10.

Next, a utilization factor $f_{UTIL}$ is calculated by dividing the size of the disc image $S_{IMG}$ by the effective storage capacity $C_{EFF}$ (block 126), according to:

$$f_{UTIL} = S_{IMG}/C_{EFF}$$

The amount of the disc image to be written to each region B is then calculated as being substantially equal to the effective capacity per region $C_{REG}$ times the utilization factor $f_{UTIL}$ (block 128), according to:

$$B \approx C_{REG} f_{UTIL}$$

The calculated amount of the disc image B is then written to each region (block 130). In this manner, the disc image is spread across the entire width of the platter 12. Consequently, when accessing the disc image, an actuator arm 18 will move a read/write head 16 through its full designed range of motion, avoiding mechanical problems stemming from severely limited actuator arm 18 motion.

For example, to write a 10 GB disc image to a 320 GB HDD 10 comprising 1024 tracks grouped at four tracks per region into $N_{REG}=301$,
$C_{REG}=320$ GB/301~1.063 GB/region
$f_{UTIL}=10$ GB/320 GB=0.03125
B~1.063 GB×0.03125~33.22 MB of the 10 GB disc image to be written to each region.

The calculation is approximate to account for rounding errors, decimal to binary conversions, and the like. It is not critical that each region hold a precisely equal amount of the disc image; rather, a substantially equal distribution of the disc image across all available regions will ensure that, on average, the actuation arm 18 regularly moves over the entire extent of the platter 12.

Alternatively, the approach of FIG. 7 may be utilized, simply writing fixed-length sectors (or a predetermined multiple of sectors) in each region (or in each track in each region) across the platter 12, and repeating, effectively striping the data radially across the platter 12. The resulting distribution, in terms of the amount of data allocated per region, will be substantially the same as in the approach outlined above. The advantages and disadvantages of these two approaches are similar to those discussed above. Those of skill in the art may readily assess the tradeoffs in data access latency and actuation arm 18 motion for any particular application, given the teachings of the present disclosure.

Figure 10:
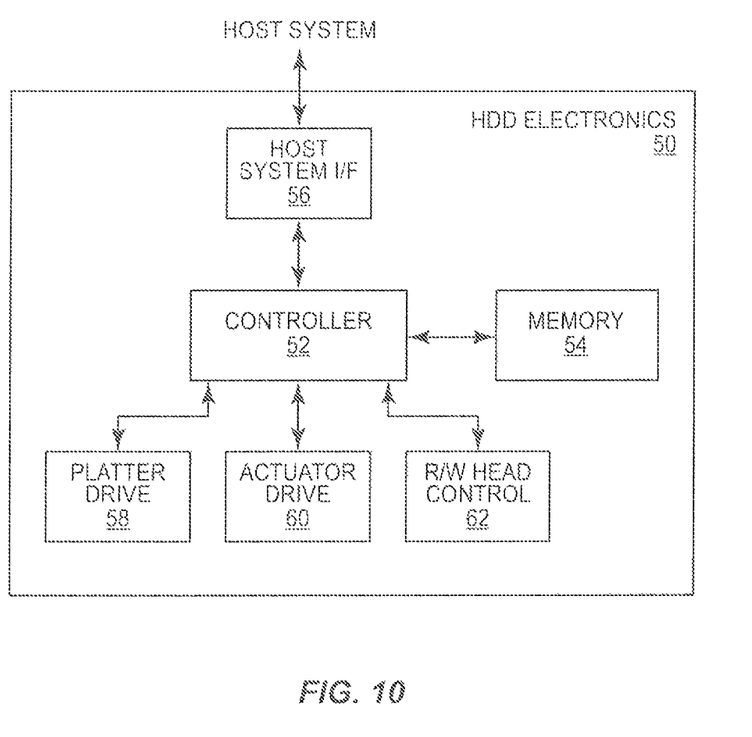
FIG. 10 is a functional block diagram of hard disc drive electronics.

FIG. 10 depicts some of the major functional blocks of the electronics 50 in a HDD 10. The HDD electronics 50 include a controller 52 coupled to memory 54, and interfaced to a host system interface 56, platter drive electronics 58, actuator arm drive electronics 60, and read/write head control electronics 62. Those of skill in the art will readily recognize that the electronics 50 may include additional functional blocks (e.g., error correction coding; bad sector remapping; encryption; Self-Monitoring, Analysis, and Reporting Technology, or SMART; and the like) that are not germane to discussion of embodiments of the present invention, and are omitted from FIG. 10 for clarity.

The controller 52, which in some embodiments may comprise a plurality of separate controller circuits, may comprise any sequential state machine operative to execute machine instructions stored as machine-readable computer programs in the memory 54, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. The processor is operatively coupled to memory 54, which may comprise any non-transitory machine-readable media known in the art, such as SRAM, DRAM, DDRAM, ROM, PROM, EPROM, Flash memory, and the like.

The controller 52 communicates with a host system (computer, POS, or the like) via a host system interface 56, which may implement any of a variety of industry standard bus protocols, such as IDE or EIDE, SATA, SCSI, Serial Attached SCSI (SAS), Fibre Channel, or the like. Alternatively, the host system interface 56 may implement a fully custom data exchange protocol.

The controller 52 also controls platter drive electronics 58 operative to control the spindle motor to drive the platter 12 at a predetermined speed. The controller 52 further controls the actuator drive electronics 60 operative to control the actuator 22 that drives the actuator arm 18 about its pivot 20 to position the read/write head 16 over a desired track on the platter 12. Finally, the controller 52 controls read/write head control electronics 62 that perform actual data write and read operations on the platters by transducing electrical to magnetic signals and vice versa.

The memory 54 is operative to store, and the controller 52 operative to execute, software modules operative to cause the HDD 10 to perform embodiments of the present invention described herein, such as the methods 100, 200.

By carefully selecting the physical data storage space on the platter 12 (or at least a region thereof) that is allocated for use when clipping a larger capacity HDD 10 to form a clipped HDD having a lower effective capacity, motion of the actuator arm 18 across the full extent of the platter 12 is ensured, thus avoiding the buildup of lubrication or other mechanical problems that may otherwise result from a severely limited range of motion by the actuator arm 18. In a closely related concept, a disc image may be written to a HDD 10 (whether of native capacity or having been clipped to an lower effective capacity) in such a way as to ensure that the actuator arm 18 will experience a full range of motion across the platter 18 during normal read and write operations to the disc image, particularly in cases where the size of the disc image is much smaller than the available HDD storage capacity.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of clipping a hard disc drive, the drive having a native data storage capacity arranged in a plurality of concentric tracks on one or more platters, the drive being clipped to have an effective storage capacity lower than the native capacity, the method comprising:
    allocating for use only storage space up to the effective storage capacity, selected from storage space within the native storage capacity; and
    writing data to and reading data from only the allocated storage space, such that the drive is effectively limited to the effective capacity;
    wherein the effective storage capacity allocated for use comprises both first storage space in one or more tracks in a radially innermost region of the platter and second storage space in one or more tracks in a radially outermost region of the platter;
    whereby in operation, an actuator arm moves a read/write head between the radially innermost region and radially outermost region of the platter during data read and write operations.

2. The method of claim 1, wherein successive blocks of data are allocated for use alternately from the radially innermost region of the platter and the radially outermost region of the platter.

3. The method of claim 1, wherein the effective storage space allocated for use further comprises storage space in one or more tracks interposed between the innermost and outermost regions.

4. The method of claim 3, wherein the tracks are divided into a plurality of regions, and wherein the effective storage space allocated for use is distributed among the plurality of regions.

5. The method of claim 4, wherein the effective storage space allocated for use is substantially evenly divided among the plurality of regions.

6. The method of claim 5, further comprising, when writing a disc image to the drive:
calculating an effective capacity per region by dividing the effective storage capacity by the number of regions;
calculating a utilization factor by dividing the size of the disc image by the effective storage capacity; and
writing an amount of the disc image to each region that is substantially equal to the effective capacity per region times the utilization factor.

7. The method of claim 5, further comprising, when writing a disc image to the drive:
dividing the disc image into a plurality of blocks, each having a size equal to a multiple of the size of a sector on the drive; and
writing successive blocks of the disc image to successive contiguous regions between the radially innermost region of the platter and the radially outermost region of the platter, and repeating as necessary to write the disc image.

8. The method of claim 4, wherein successive blocks of data are allocated for use successively from contiguous regions ranging between the radially innermost region of the platter and the radially outermost region of the platter, inclusively, and repeating as necessary to allocate the effective storage space.

9. A method of operating a hard disk drive having an effective storage capacity arranged in a plurality of concentric tracks on one or more platters, wherein the disc is operative to store a drive image, comprising:
dividing the tracks into a plurality of contiguous regions extending from a radially innermost region of the platter to a radially outermost region of the platter, each region including a substantially equal amount of storage space;
calculating a storage capacity per region by dividing the effective storage capacity by the number of regions;
calculating a utilization factor by dividing the size of the disc image by the effective storage capacity; and
writing an amount of the disc image to each region that is substantially equal to the storage capacity per region times the utilization factor;
whereby in operation, an actuator arm moves a read/write head over all regions of the platter during read and write operations to the disc.

10. The method of claim 9 wherein the effective storage capacity of the disc is less than the total available storage capacity of the disc, and further comprising:
allocating only the effective storage capacity to be available for use, selected from the total available storage capacity; and
writing data to and reading data from only storage space making up the allocated effective storage capacity.

11. A hard disc drive having a native data storage capacity clipped to provide an effective data storage capacity less than the native capacity, comprising:
one or more platters operative to store data in a plurality of concentric tracks;
an actuator arm operative to move a read/write head radially over the platter and align it with any track; and
a controller circuit operative to
allocate for use only storage space up to the effective storage capacity, selected from storage space within the native storage capacity, and
write data to and read data from only the allocated storage space, such that the drive is effectively limited to the effective capacity,
wherein the effective storage capacity allocated for use comprises both first storage space in one or more tracks in a radially innermost region of the platter and second storage space in one or more tracks in a radially outermost region of the platter;
whereby in operation, the actuator arm is operative to move the read/write head between the radially innermost region and radially outermost region of the platter during data read and write operations.

12. The drive of claim 11, wherein successive blocks of data are allocated for use alternately from the radially innermost region of the platter and the radially outermost region of the platter.

13. The drive of claim 11, wherein the effective storage space allocated for use further comprises storage space in one or more tracks interposed between the innermost and outermost regions.

14. The drive of claim 13, wherein the drive tracks are divided into a plurality of regions, and wherein the effective storage space allocated for use is distributed among the plurality of regions.

15. The drive of claim 14, wherein the effective storage space allocated for use is substantially evenly divided among the plurality of regions.

16. The drive of claim 15, wherein, when writing a disc image to the drive, a disc image writing circuit is operative to
calculate an effective capacity per region by dividing the effective storage capacity by the number of regions;
calculate a utilization factor by dividing the size of the disc image by the effective storage capacity; and
write an amount of the disc image to each region that is substantially equal to the effective capacity per region times the utilization factor.

17. The drive of claim 15, wherein, when writing a disc image to the drive, a disc image writing circuit is operative to:
divide the disc image into a plurality of blocks, each having a size equal to a multiple of the size of a sector on the drive; and
write successive blocks of the disc image to successive contiguous regions between the radially innermost region of the platter and the radially outermost region of the platter, and repeating as necessary to write the disc image.

18. The drive of claim 14, wherein successive blocks of data are allocated for use successively from contiguous regions ranging between the radially innermost region of the platter and the radially outermost region of the platter, inclusively, and repeating as necessary to allocate the effective storage space.

19. A system, comprising a hard disc drive operative to store a disc image, comprising:
a hard disc drive having an effective data storage capacity in a plurality of concentric tracks on one or more platters;
a controller circuit operative to write a disc image to the hard disc drive, by
dividing the tracks into a plurality of contiguous regions extending from a radially innermost region of the platter to a radially outermost region of the platter, each region including a substantially equal amount of storage space,
calculating a storage capacity per region by dividing the effective storage capacity by the number of regions, calculating a utilization factor by dividing the size of the disc image by the effective storage capacity, and writing an amount of the disc image to each region that is substantially equal to the storage capacity per region times the utilization factor;

whereby subsequent to writing the disc image, the hard disc drive is operative to move an actuation arm holding a read/write head over all regions of the platter during read and write operations to the disc.

20. The system of claim 19 wherein the effective storage capacity of the disc is less than a total available storage capacity of the disc, and wherein a controller circuit in the hard disc drive is operative to:

allocate only the effective storage capacity to be available for use, selected from the total available storage capacity; and write data to and read data from only storage space making up the allocated effective storage capacity.

* * * * *